United States Patent Office 2,849,028
Patented Aug. 26, 1958

2,849,028
CELLULAR PRODUCTS AND METHOD OF MANUFACTURE

Lawrence Clark, Lancaster, Thaddeus J. Grabowski, Salisbury Township, Lancaster County, and Algirdas C. Poshkus, Lancaster, Pa., assignors to Armstrong Cork Company, Lancaster, Pa., a corporation of Pennsylvania No Drawing. Application October 3, 1955
Serial No. 538,262

12 Claims. (Cl. 138—49)

This invention relates generally to cellular products and more particularly to flexible cellular products having a substantially closed-cell cellular system. Still more particularly it relates to a hollow, cylindrical, flexible, cellular article having a particular composition. The invention also relates to methods of making the article.

Despite much work on the subject, there has yet to be produced an economical substantially closed-cell, flexible, cellular product capable of meeting the wide demand for such a product. Prior products have suffered from the deficiencies of being too stiff, too limp, too unstable in use, or too absorbent, particularly where the products are to be used as pipe insulation.

It is, therefore, the primary object of the present invention to present a cellular product which does not have these deficiencies. It is a further object to present a hollow, cylindrical, flexible, substantially closed-cell, cellular article peculiarly adapted to serve as pipe insulation over a wide range of temperatures and other conditions.

These objects have been achieved in a surprisingly effective manner. The invention contemplates blending a thermoplastic polyvinyl resin having a long melting point range with a rubbery butadiene copolymer selected from the group consisting of butadiene-styrene and butadiene-acrylonitrile copolymers. The resin is present in an amount in the range of about 25–45 parts by weight per 100 parts by weight of the rubber. Filler and plasticizer are incorporated in the mix. The mix also contains an intimate dispersion of a combined blowing and curing agent consisting of p,p′-oxybis (benzene sulfonyl hydrazide) in an amount of about 1–25 parts by weight per 100 parts by weight of the rubber. The final mix is free of sulfur. The sulfur-free mixture is then extruded to form a hollow, cylindrical object. The object is then heated at a temperature sufficient to decompose the blowing agent and to isotropically expand the object in the absence of a mold. Curing also results.

It can be seen that a blend of a rubber and a resin is a basis for the method of the present invention. However, only a particular class of resin and a particular class of rubber will serve, and, furthermore, the relative amounts of these two ingredients must be maintained within certain proportions.

The resin to be used in the present invention may be defined as a thermoplastic polyvinyl resin having a long melting point range. This means that the resin possesses a repetitive vinyl group, or residue thereof, along the polymer chain. Exemplary of such resins are polyvinyl chloride, vinyl chloride-vinyl acetate copolymers, polyethylene, polystyrene, copolymers of styrene, and mixtures of these resins. Preferably, the resin will be polystyrene.

The thermoplastic polyvinyl resins to be used in the present invention should not have a sharp melting point such as is found with the available cumars and similar petroleum resins. It is preferred that the polyvinyl resin possess a ring and ball melting point of at least about 100° C. The melting or softening point of the thermoplastic polyvinyl resins should extend over relatively long range of temperatures as opposed to those resins which melt within a short, narrow range of temperatures. It is characteristic of the resins to be used herein that they may not be described by melting points but may only be described generally by a ring and ball softening point. The ring and ball softening point is simply another way of saying that as the resin is subjected to gradually increasing temperature it becomes progressively softer and softer until a liquid state is achieved; it can be seen that such a situation does not meet the usual definition of melting point.

Examples of suitable resins are the polyethylene resins designated as "DYNF" and "DYGT," sold by the Bakelite Company. This company also markets a polyvinyl chloride resin containing about 15% vinyl acetate designated as "VYHH," which may be used herein. The polystyrene resins sold by the Koppers Company, designated as "3X," "8X," and "KTPL," are suitable. Various acrylate resins, such as methyl methacrylate, may be used. Blends of polyvinyl resins and rubbery butadiene copolymers, such as the "Polyblends" sold by the B. F. Goodrich Company, may also be used so long as additional resin or rubber is added to the mixture to adjust the ratio of the two ingredients to that called for by the present invention. It must be pointed out that it is not necessary that the polyvinyl resin be compatible with the rubbery butadiene copolymer but that the resin must be at least dispersible at elevated temperatures in the rubbery copolymer.

The rubbery butadiene copolymer to be used in the present invention may be either a butadiene-styrene copolymer, a butadiene-acrylonitrile copolymer, or mixtures thereof. Since it is essential that the copolymer be of a rubbery nature, it is apparent that at least about 50% buadiene be present in the molecule. Where butadiene-styrene copolymers of the GR–S type are used, the amount of styrene to be copolymerized with the butadiene-1,3 will vary from about 3% to about 43% by weight. Preferably, however, the GR–S will contain about 23% styrene. Where butadiene-acrylonitrile copolymers are used, the amount of acrylonitrile in the molecule will vary between about 30% and 40% by weight and, preferably, about 38%–40% by weight.

As mentioned earlier, the amount of thermoplastic polyvinyl resin must be in the range of about 25–45 parts by weight per 100 parts by weight of the rubbery butadiene copolymer. If the amount of polyvinyl resin is lower than about 25 parts per 100 parts by weight rubber, the composition is too rough and nervy to obtain smooth extrusions. If the amount of polyvinyl is greater than about 45 parts by weight per 100 parts by weight rubber, then the final product is too stiff and the cell walls are too brittle to maintain the desired closed-cell system. The preferred range of resin to rubber is in the range of 35–40 parts by weight per 100 parts by weight rubber.

Various fillers may be incorporated into the mix in order to give the final product the desired body. Examples of such fillers are limestone, $TiO_2$, slate flour, clay, silica, and carbon black. The total amount of filler will generally run about 5–60 parts by weight per 100 parts by weight rubber, and, preferably, will be between 35–45 parts by weight per 100 parts by weight rubber. Mixtures of fillers can be used if desired. It is often convenient to incorporate antimony trioxide as part or all of the filler system in order to impart flame resistance to the final cellular product. The antimony trioxide is preferably used in an amount of about 10–20 parts by weight per 100 parts by weight rubber. Pigments may be incorporated in order to impart the desired color to the final product; products having different colors are useful in keying a piping system to aid in the identification of the substances carried by the individual pipe lines.

Where a black product is needed, carbon black may be incorporated to strengthen the final product, as well as to impart a uniform dead black color to the final product.

Any of the plasticizers normally used with resin or rubber systems may be incorporated into this composition. The high-boiling esters, ethers, and ketones, for example, tricresol phosphate, dibutyl phthalate, di-2-ethylhexyl phthalate, butyl phthalyl butyl glycolate, dibutyl sebacate, and the like are suitable. Lubricants such as stearic acid, including waxes such as paraffin or ceresin wax or wax mixtures, may be used in small amounts. Chlorinated paraffins which generally contain 38%–70% chlorine can be used as a combination plasticizer and fire-retardant agent, particularly where antimony trioxide is used as part of the filler system. Other chlorinated plasticizers are suitable.

Generally speaking, the amount of plasticizer is not critical. The amount of plasticizer normally used to give good workable compositions will suffice in the present case. As is well known, too large an amount of plasticizer will yield a soft product having extremely flexible cell walls. The amount of plasticizer will generally range between 5 and 60 parts by weight per 100 parts by weight rubber and preferably 30–50 parts by weight per 100 parts by weight rubber.

The blowing agent to be used in the present invention is the compound p,p'-oxybis (benzene sulfonyl hydrazide). Use of this compound yields the extraordinarily versatile product of the present invention. Both the compound itself and its degradation products appear to function as curing agents, thus rendering unnecessary the need for any sulfur or similar curing agent in the composition. This hydrazide, when used to blow the particular composition disclosed herein, yields an extraordinarily uniform cell structure wherein the great majority of the cells are of the closed-cell type. Furthermore, the closed-cell structure maintains its integrity even under an extraordinary degree of flexing and bending.

Generally speaking, the amount of the p,p'-oxybis (benzene sulfonyl hydrazide) to be added to the composition will vary between about 1–25 parts by weight per 100 parts by weight rubber and preferably between about 15 and 19 parts by weight per 100 parts by weight rubber; specifically 17 parts by weight hydrazide is preferred. It is apparent that varying the amount of the blowing agent within the limits given above will cause varying amounts of expansion when the composition is heated to decompose the blowing agent. Thus, although the degree and size of the porosity may be controlled by the amount of blowing agent to be added, it has been found that the optimum cell size and structure for general all-around use is obtained when the blowing agent is incorporated in an amount of about 15–19 parts by weight per 100 parts by weight rubber.

No sulfur is used in the composition and no antioxidant other than that already in the rubber is needed, although such could be incorporated if desired.

The above-described composition may be readily prepared. The rubber may be first broken down on a mill, after which the resin may be incorporated therein with the aid of heat, usually between about 250° to about 350° F., depending on the softening point of the resin. When the two ingredients have been thoroughly intermingled, as for example after about 10 minutes of hot mixing, the filler, as for example carbon black, plus antimony trioxide, if such is to be added, may be incorporated into the resin-rubber mixture on the mill followed by addition of the plasticizer system. This mixture may be stored for a while if desired. As a final step in the preparation of a composition, the filled and plasticized rubber-resin mixture may be cold milled during which time the blowing agent may be added. Intimate dispersion of the blowing agent in the mix is required in accordance with good practice.

Subsequent to the formation of the completed composition, the composition may be extruded. Extrusion may be carried out on the standard extruders found on the market capable of extruding a hollow cylinder. The extruder will preferably have various sized dies and pins in order that hollow cylinders having various inner and outer diameters and various wall thicknesses may be extruded therefrom. Preferably, the extruder will be followed by a cutter which can cut the hollow cylinder to the desired length.

Once the composition has been extruded in the form of a solid hollow cylinder of the desired length, there remains only the step of heating the extruded cylinder to a temperature sufficient to decompose the blowing agent. This temperature should generally be in the range of about 250°–330° F. Preferably the temperature is about 300° F. Thus the extruded hollow cylinder is placed in an oven or similar enclosure, heated to a temperature in the range given above until expansion has ceased. On cooling, the cured product of the present invention is completed.

The heating step may be carried out in two stages if desired. The hollow cylinder as extruded may be heated initially to a temperature in the range of about 200°–230° F., and preferably 220° F., and maintained at that temperature for about 30–60 minutes. This preheating step accomplishes a certain degree of precure. This precure can be used to control to some extent the stiffness of the final product. If the precure step is carried out for too long a period of time, the final product may be too stiff or indeed it may not expand fully when the temperature is finally raised sufficiently to decompose the blowing agent. A short period of precure, however, can serve to stiffen up a product which might otherwise be too limp once the blowing agent has decomposed. It must be emphasized that the precure step is not essential but is merely a matter of convenience.

Although the degree of expansion will depend in large measure on the amount of blowing agent incorporated in the composition, where consistent amounts of blowing agent are used, the expansion follows a predetermined path. Using preferred amounts of the blowing agent, the ratio of the original length to the expanded length will be about 1:1.8. The ratio of the original inner diameter and outer diameter to the expanded inner diameter and outer diameter will be about 1:2.1. Use of consistent amounts of the blowing agent within the broad range given above but outside of the preferred range will soon establish different ratios of unexpanded dimensions to expanded dimensions. It is one of the surprising advantages of the present invention that the final product is unexpectedly reproducible within unusually close tolerances. It is not to be anticipated that an expansion carried out in the absence of molds, as is done herein, could consistently result in reproducible isotropic expansion. Thus where pipe insulation material is to be produced, it is a simple matter to determine the size of the unexpanded hollow cylinder which will expand into the desired size to be used directly as insulation on a given standard size pipe line.

The product of the present invention will be found to have excellent properties from an insulation standpoint. The product has low thermal conductivity, very low water vapor and air permeability, and low water absorption. The thermal conductivity has been found to be approximately the same as that of corkboard. The product is an excellent vapor barrier throughout its entire thickness, since many samples of varying thicknesses yield the same low figure. The water pick-up after 15 days of total immersion in water is only about 14% by weight, emphasizing the excellence of the closed-cell system that exists throughout the product.

The following examples illustrate several embodiments of the invention. All parts are by weight unless otherwise stated.

EXAMPLE I

One hundred parts by weight butadiene-styrene copolymer containing 23% styrene (GR-S 1001) was placed on a mill. After several minutes, there was added 37.5 parts polystyrene and mixing was continued at about 320° F. until the GR-S and resin were fused together.

To the mix on the mill was added 35 parts carbon black and 15 parts antimony trioxide. After thorough mixing, 40 parts of chlorinated paraffin containing 38%–42% chlorine (Chlorowax 40) was added, thoroughly mixed, and the entire mixture dumped.

The cooled mix was put on a mill, cooled with refrigerated water, and there was added 17 parts p,p'-oxybis (benzene sulfonyl hydrazide) and milling was continued for 10 minutes.

The mix was removed from the mill and extruded through a 4½" Royle extruder. The extruded hollow cylinder of wall thickness of ¼" and inner diameter of 0.43" was cut into lengths measuring 3 feet long. These lengths were placed in an oven maintained at 220° F. and left there for 60 minutes, following which the temperature was raised to 300° F. After 60 minutes, the expanded object was removed from the oven and cooled.

The product was a cured hollow, cylindrical, flexible, substantially closed-cell article which could easily be slipped over a pipe line having a 90° elbow therein. The wall thickness of the product measured ½" and the inner diameter was 0.91". The resistance to solvents of the product is shown in the following table:

Table
EFFECT OF CHEMICALS AND SOLVENTS ON PRODUCT

|  | 24 hours | 48 hours | 7 days | 14 days |
|---|---|---|---|---|
| Toluene | SS | S | ES | Shrank |
| Naphtha | VSS | SS | S | ES |
| Methyl ethyl ketone | VSS | SS | S | S |
| Ethyl alcohol | U | U | U | U |
| Safety solvent | SS | S | S | S |
| Kerosene | U | U | SS | SS |
| Light oil | U | U | U | SS |
| 10% HCl | U | U | U | U |
| 10% H₂SO₄ | U | U | U | U |
| 10% NaOH | U | U | U | U |
| 50% H₂O₂ | U | U | gummy | |

U—Not affected
VSS—Very slight swelling
SS—Slight swelling
S—Moderate swelling
ES—Extreme swelling

EXAMPLE II

A composition was prepared as in Example I save the following ingredients were used:

| | Parts |
|---|---|
| Butadiene-styrene copolymer (23% styrene) | 100 |
| Polystyrene | 35 |
| Carbon black | 35 |
| Aliphatic hydrocarbon oil (dipolymer oil) | 25 |
| p,p'-Oxybis (benzene sulfonyl hydrazide) | 14.7 |

The above composition was extruded in the usual manner and subjected to a free expansion at 300° F. An excellent product having a density of 10.4 pounds per cubic foot resulted.

EXAMPLE III

The procedure of Example I was repeated except that the following ingredients were used:

| | Parts |
|---|---|
| Butadiene-acrylonitrile copolymer (38%–40% acrylonitrile) | 71.4 |
| 55% polyvinyl chloride / 45% butadiene-acrylonitrile copolymer } "Polyblend" | 63.6 |
| Carbon black | 35 |
| Tricresyl phosphate | 35 |
| p,p'-Oxybis (benzene sulfonyl hydrazide) | 20 |

The composition was extruded and subject to a free expansion at 300° F. in the usual manner. The product was an excellent pipe insulation having a density of 6.4 pounds per cubic foot.

EXAMPLE IV

The procedure of Example I was repeated save that the following ingredients were used:

| | Parts |
|---|---|
| Butadiene-acrylonitrile copolymer (38%–45% acrylonitrile) | 75 |
| Polyvinyl chloride+butadiene-acrylonitrile copolymer ("Polyblend" 700×790) | 100 |
| Carbon black | 45 |
| Chlorinated paraffin | 20 |
| Calcium stearate | 1.5 |
| Dibasic lead phosphite | 1.0 |
| Firestone ST-100 (cadmium mercapto soap stabilizer) | 0.5 |
| p,p'-Oxybis (benzene sulfonyl hydrazide) | 35 |

On extruding and free expansion as usual, an excellent pipe insulation resulted.

We claim:

1. The method of making a hollow, cylindrical, flexible, substantially closed-cell cellular article which comprises blending a thermoplastic polyvinyl resin having a long melting point range with a rubbery butadiene copolymer selected from the group consisting of butadiene-stryene and butadiene acrylonitrile copolymers, said resin being present in an amount in the range of about 25–45 parts by weight per 100 parts by weight of said rubber, adding filler and plasticizer to said mix, intimately blending a blowing agent consisting of p,p'-oxybis (benzene sulfonyl hydrazide) therein in an amount of about 1–25 parts by weight per 100 parts by weight of said rubber to form a sulfur-free mixture, extruding resulting mixture to form a hollow, cylindrical object, and heating said object at a temperature sufficient to decompose said blowing agent to isotropically expand said object in the absence of a mold.

2. The method according to claim 1 wherein said polyvinyl resin comprises polystyrene.

3. The method according to claim 1 wherein said polyvinyl resin comprises polyvinyl chloride.

4. The method according to claim 1 wherein said polyvinyl resin is present in an amount of about 35–40 parts by weight per 100 parts by weight rubber and said blowing agent is present in an amount of about 15–19 parts by weight per 100 parts by weight rubber.

5. The method according to claim 1 wherein said temperature lies in the range of about 250°–330° F.

6. The method according to claim 1 wherein said filler comprises carbon black.

7. The method of making a hollow, cylindrical, flexible, substantially closed-cell cellular article which comprises blending butadiene-styrene copolymer containing about 23% styrene, polystyrene, carbon black, antimony trioxide, chlorinated paraffin wax, and p,p'-oxybis (benzene sulfonyl hydrazide) together to form a blended composition, the ingredients being present in the ratio of about 100 parts by weight of said copolymer, 37.5 parts by weight polystyrene, 35 parts by weight carbon black, 15 parts by weight antimony trioxide, 40 parts by weight chlorinated paraffin wax, and 17 parts by weight p,p'-oxybis (benzene sulfonyl hydrazide), extruding said composition in the form of a hollow cylinder, and subjecting the extruded composition to a free expansion at a temperature in the range of about 250°–330° F.

8. A hollow, cylindrical article comprising a flexible, substantially closed-cell, cellular, cured, sulfur-free composition comprising a rubbery butadiene copolymer selected from the group consisting of butadiene-styrene and butadiene-acrylonitrile copolymers, a thermoplastic polyvinyl resin having a long melting point range in an amount in the range of about 25–45 parts by weight per each 100 parts by weight of said rubber, plasticizer, and filler, said cells being formed by the gaseous decomposition products of p,p'-oxybis (benzene sulfonyl hydrazide).

9. A product according to claim 8 wherein said polyvinyl resin comprises polystyrene.

10. A product according to claim 9 wherein said rubbery butadiene copolymer comprises butadiene-styrene copolymer.

11. An article according to claim 10 wherein said plasticizer comprises chlorinated paraffin wax and said filler comprises carbon black and antimony trioxide.

12. A hollow, cylindrical article comprising a flexible, substantially closed-cell, cellular, cured, elemental sulfur-free composition comprising a blend of relative proportions of about 100 parts by weight rubbery butadiene-styrene copolymer, about 35–40 parts by weight polystyrene, and about 30–50 parts by weight plasticizer for said blend, said cells and said cure being caused by the thermal decomposition of about 15–19 parts by weight p,p'-oxybis (benzene sulfonyl hydrazide) dispersed throughout said blend.

References Cited in the file of this patent

UNITED STATES PATENTS

| | | |
|---|---|---|
| 2,023,204 | Munters et al. | Dec. 3, 1935 |
| 2,330,353 | Henderson | Sept. 28, 1943 |
| 2,450,436 | McIntire | Oct. 5, 1948 |
| 2,526,311 | Wilson | Oct. 17, 1950 |
| 2,590,156 | Carpentier | Mar. 25, 1952 |
| 2,743,931 | Pooley et al. | May 1, 1956 |
| 2,746,088 | Lindermann et al. | May 22, 1956 |